United States Patent [19]

Funck

[11] 4,160,168

[45] Jul. 3, 1979

[54] METHOD OF AND MEANS FOR DETERMINING THE LEVEL OF A METALLIC BATH

[75] Inventor: Alfred Funck, Esch, Luxembourg

[73] Assignee: ARBED - Acieries Reunies de Burbach-Eich-Dudelange S.A., Luxembourg, Luxembourg

[21] Appl. No.: 845,775

[22] Filed: Oct. 26, 1977

[30] Foreign Application Priority Data

Oct. 26, 1976 [LU] Luxembourg .......................... 76077

[51] Int. Cl.² .................. B22D 1/02; B22D 11/16; G01F 23/00; G05D 9/12
[52] U.S. Cl. ................................... 250/564; 73/293; 137/395; 164/4; 164/83; 164/155; 164/449; 222/64; 222/594; 250/577; 250/235; 340/619
[58] Field of Search ............ 250/577, 206, 564, 565, 250/215, 573, 574, 234, 235; 340/618, 619; 222/64, 590, 591, 594; 137/386, 391, 395; 73/290 R, 293; 141/95, 198; 164/4, 82, 83, 150, 155, 449; 358/101

[56] References Cited

U.S. PATENT DOCUMENTS

| | | | |
|---|---|---|---|
| 2,246,907 | 6/1941 | Webster | 164/449 |
| 2,825,104 | 3/1958 | Jones | 164/4 |
| 3,838,727 | 10/1974 | Levi et al. | 164/82 X |
| 3,842,894 | 10/1974 | Southworth et al. | 164/82 X |

Primary Examiner—Siegfried H. Grimm
Attorney, Agent, or Firm—Karl F. Ross

[57] ABSTRACT

The level of a metallic bath, e.g. of an iron melt in an ingot mold, is determined by recurrent electro-optical scanning of the interior of the vessel along a narrow vertical strip zone. The output signals of the scanner are processed in an arithmetic unit which averages successive readings, to compensate for fluctuations, and may also receive a corrective signal in order to offset periodic level changes due to an intentional rocking of the vessel. The arithmetic unit may work into a visual indicator and into a controller adjusting the rate of inflow and/or withdrawal to maintain the bath level substantially constant.

8 Claims, 1 Drawing Figure

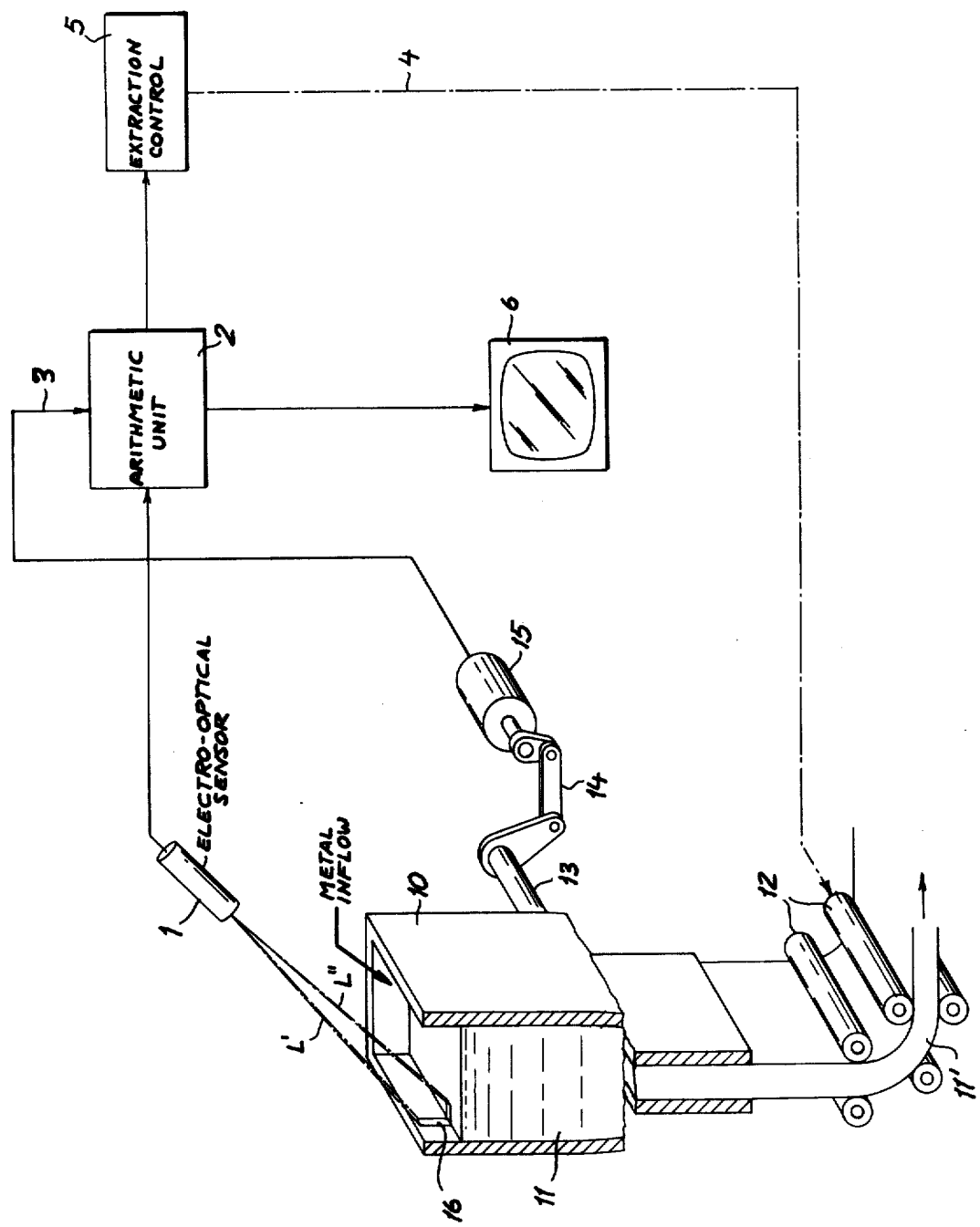

001
METHOD OF AND MEANS FOR DETERMINING THE LEVEL OF A METALLIC BATH

FIELD OF THE INVENTION

My present invention relates to a method of and means for determining the level of a metallic bath present in a vessel, e.g. in an ingot mold.

BACKGROUND OF THE INVENTION

The maintenance of a substantially constant bath level is important for the purpose of controlling the quality of an ingot, especially with continuous casting. Thus, the rate of supply of fresh molten metal and/or the extraction speed of the ingot should be controlled in a manner compensating for deviations from the desired level.

Conventional methods of detecting such a bath level in an ingot mold involve temperature measurements, supersonic soundings, or the transmission of radioactive particles through the vessel wall. These techniques must be specifically adapted to the given mold configuration and frequently require the emplacement of fragile sensors in the immediate vicinity of the inflow.

OBJECTS OF THE INVENTION

An important object of my present invention, therefore, is to provide an improved method of determining the level of a metallic bath (and compensating for deviations) with avoidance of the aforestated drawbacks.

A related object is to provide a simple device for carrying out that method.

SUMMARY OF THE INVENTION

According to one aspect of my invention, a part of the inner vessel wall and of the adjoining melt surface is electro-optically scanned in a succession of sweeps to detect the location of the boundary between the wall and the melt in each sweep, with translation of these detected locations into signal voltages which are subsequently averaged to establish a resulting level reading.

That reading can be used to operate a variety of loads, ranging from a visual indicator to a mechanism for controlling the rate of influx and/or of extraction.

According to another aspect of my invention, the scanning of the vessel wall and of the melt surface is carried out by electro-optical sensing means working into a processor which consists essentially of an arithmetic unit averaging the series of signal voltages representative of the detected boundary locations. The processor may also have an input for corrective signals from a mechanism serving to rock the vessel in order to prevent adhesion between the bath metal and the vessel walls.

According to an advantageous feature of my invention, the sweep of the electro-optical sensing means is limited to a narrow vertical zone so that only a strip of the vessel wall and an extension of that strip on the melt surface are scanned. This narrowing of the sweep not only simplifies the construction of the sensing equipment and associated components but also minimizes the effect of local turbulence in the bath, such as rising bubbles, upon the readings.

The electro-optical sensing need not be carried out in the visible spectrum but may be performed with infrared radiation, for example.

BRIEF DESCRIPTION OF THE DRAWING

The above and other features of my invention will now be described in detail with reference to the accompanying drawing the sole FIGURE of which illustrates, diagrammatically, a device for measuring the level of a metallic bath in an ingot mold.

SPECIFIC DESCRIPTION

In the drawing I have shown a conventional ingot mold 10 to which molten iron or other metal 11 is continuously supplied, as indicated diagrammatically by an arrow labeled METAL INFLOW, and from which the solidified mass 11' is continuously extracted by a set of rollers 12. The mold 10 is rockable about an axle 13 by a linkage 14 driven by a motor 15. The usual conduits for cooling the metal in the lower part of the mold have not been illustrated.

In accordance with my present invention, an electro-optical sensor 1 (or an array of such sensors) is trained upon the interior of mold 10 and is effectively oscillated in a vertical plane to sweep a narrow strip 16 along the inner vessel wall and the adjoining melt surface. Sensor 1 may be physically oscillated between limits L' and L" of its sweep or may electronically scan the strip 16, as in a television camera. A particularly simple arrangement comprises a set of vertically superposed lenses focused upon different locations along strip zone 16 and disposed in front of respective photocells (which may be sensitive to infrared radiation). In any event, the extent of the sweep may be limited to about 5 to 10 mm in width and 10 to 12 cm in length as measured along the vertical vessel wall in the absence of the melt 11; in such a case of total of eight lenses and eight photocells will usually be sufficient.

Sensor 1 works into an arithmetic unit 2 which receives, on an input 3, a corrective sinusoidal signal from rocker drive 15 and which integrates the numerical values so corrected. One output of unit 2 goes to an extraction-control unit 5 which, as schematically indicated at 4, varies the speed of rollers 12 in order to maintain a substantially constant bath level. Unit 5 could also control, additionally or alternatively, the supply rate of the melt at the metal inflow. Another output of arithmetic unit 2 goes to a viewer 6 such as an oscilloscope.

Unit 2 may include a set of eight comparators with first inputs respectively connected to the outputs of the aforementioned photocells and with second inputs connected to a source of reference potential, each comparator working into a respective stage of a register which is periodically scanned to produce a train of pulses whose width varies with the number of loaded stages; the corrective signal introduced at input 3 periodically modifies this pulse amplitude, in a variable-gain amplifier or an adjustable attenuator, whereupon the pulses are integrated in an R/C network to yield the proper level reading. Even with scanning performed by the successive energization of fixedly positioned sensors, the strip zone 16 is effectively swept by the sensing means 1. The angular spacing of the axes of these fixed electro-optical sensors determines the tolerance limits within which the bath level may vary over an extended period.

Although my invention is primarily intended for the control of the bath level in an ingot mold, it can also be used in a metal-coating system of the type described in my copending application Ser. No. 845,774 of even date relating to the one-sided metallization of a sheet passing over a bath of zinc or the like whose level is to be kept just below the path of the sheet.

I claim:

1. A method of determining the level of a metallic melt in a vessel subjected to an oscillatory motion, comprising the steps of electro-optically scanning a part of the inner vessel wall and of the adjoining melt surface in a succession of sweeps, detecting the location of the boundary between the wall and the melt in each sweep, translating the detected locations into signal voltages, modifying said signal voltages to offset the effect of said oscillatory motion, and averaging said signal voltages to establish a resulting level reading.

2. A method as defined in claim 1 wherein said sweeps are aimed at a narrow vertical zone of said wall and an extension thereof on the melt surface.

3. A method as defined in claim 1 wherein metal is continuously added to and withdrawn from said melt, comprising the further step of using said level reading to balance the rates of metal inflow and outflow for maintaining a substantially constant level of said melt.

4. A device for determining the level of a metallic melt in a vessel, comprising:

electro-optical sensing means disposed adjacent said vessel and operable to scan a part of the inner vessel wall and of the adjoining melt surface in a succession of sweeps;

rocker means for continuously oscillating said vessel;

processing means connected to said sensing means for receiving signals therefrom indicative of the location of the boundary between the vessel wall and the melt, converting said signals into signal voltages and averaging the latter to establish a resulting level reading, said processing means having an ancillary input connected to said rocker means for receiving a corrective signal therefrom; and a load connected to said processing means for indicating said level reading.

5. A device as defined in claim 4 wherein said load comprises a visual display.

6. A device as defined in claim 4 wherein said sensing means is effective in a narrow vertical zone.

7. A device as defined in claim 6 wherein said zone has a width on the order of a centimeter and a vertical length along said wall on the order of 10 centimeters.

8. A device as defined in claim 4 wherein said vessel is an ingot mold provided with supply means for continuously adding fresh metal to the melt and with extraction means for the continuous withdrawal of an ingot formed therein, said load including control means for adjusting said extraction means to maintain a substantially constant level of said melt.

* * * * *